United States Patent
Pol et al.

(10) Patent No.: US 10,866,992 B2
(45) Date of Patent: Dec. 15, 2020

(54) SYSTEM AND METHODS FOR IDENTIFYING, AGGREGATING, AND VISUALIZING TESTED VARIABLES AND CAUSAL RELATIONSHIPS FROM SCIENTIFIC RESEARCH

(71) Applicants: Gratiana Denisa Pol, Los Angeles, CA (US); Gilbert Jude Calvillo, San Rafael, CA (US)

(72) Inventors: Gratiana Denisa Pol, Los Angeles, CA (US); Gilbert Jude Calvillo, San Rafael, CA (US)

( * ) Notice: Subject to any disclaimer, the term of this patent is extended or adjusted under 35 U.S.C. 154(b) by 201 days.

(21) Appl. No.: 15/595,942

(22) Filed: May 15, 2017

(65) Prior Publication Data

US 2017/0329772 A1 Nov. 16, 2017

Related U.S. Application Data

(60) Provisional application No. 62/336,578, filed on May 14, 2016.

(51) Int. Cl.
| | |
|---|---|
| *G06F 16/93* | (2019.01) |
| *G06F 16/35* | (2019.01) |
| *G06F 16/36* | (2019.01) |
| *G06F 16/33* | (2019.01) |
| *G06F 16/34* | (2019.01) |
| *G06F 40/20* | (2020.01) |
| *G06F 16/31* | (2019.01) |

(52) U.S. Cl.
CPC ............ *G06F 16/93* (2019.01); *G06F 16/313* (2019.01); *G06F 16/3331* (2019.01); *G06F 16/3344* (2019.01); *G06F 16/34* (2019.01); *G06F 16/355* (2019.01); *G06F 16/367* (2019.01); *G06F 40/20* (2020.01)

(58) Field of Classification Search
CPC ........ G06F 17/21; G06F 17/27; G06F 17/271; G06F 17/2715; G06F 17/2765; G06F 17/277; G06F 17/2775; G06F 17/278; G06F 17/279; G06F 17/28; G06F 16/93; G06F 16/34; G06F 16/3331; G06F 16/3344; G06F 16/355; G06F 16/367; G06F 16/951; G06F 40/20; G06F 40/205; G06F 40/279; G06F 40/258; G06F 16/345; G06F 16/31; G06F 16/313; G06F 16/316; G07F 17/2785

See application file for complete search history.

(56) References Cited

U.S. PATENT DOCUMENTS

| | | | | |
|---|---|---|---|---|
| 6,263,335 | B1 * | 7/2001 | Paik ..................... | G06F 16/367 |
| 6,675,159 | B1 * | 1/2004 | Lin ..................... | G06F 17/2705 |
| 10,614,196 | B2 * | 4/2020 | Maitra ................... | G16H 50/70 |
| 2003/0217335 | A1 * | 11/2003 | Chung ................. | G06F 17/2785 |
| | | | | 715/206 |
| 2004/0059736 | A1 * | 3/2004 | Willse .................... | G06F 17/27 |
| 2004/0093331 | A1 * | 5/2004 | Garner .................. | G16B 50/00 |

(Continued)

*Primary Examiner* — David T. Brooks

(74) *Attorney, Agent, or Firm* — David A. Belasco; Belasco Jacobs & Townsley, LLP

(57) ABSTRACT

A system and method for extracting, searching, visualizing, and navigating scientific, technical and academic research and literature using constructs and causal relationships between such constructs, the relationships including independent variables, dependent variables, mediator variables, moderator variables, and covariate control variables.

23 Claims, 11 Drawing Sheets

(56) References Cited

U.S. PATENT DOCUMENTS

| | | | | |
|---|---|---|---|---|
| 2006/0053382 A1* | 3/2006 | Gardner | ............... | G06F 3/0482 |
| | | | | 715/764 |
| 2010/0169299 A1* | 7/2010 | Pollara | ................. | G06F 17/277 |
| | | | | 707/708 |
| 2011/0270856 A1* | 11/2011 | Dettinger | .............. | G06F 16/382 |
| | | | | 707/758 |
| 2011/0295903 A1* | 12/2011 | Chen | .................... | G06F 16/285 |
| | | | | 707/794 |
| 2012/0221583 A1* | 8/2012 | Kulack | .............. | G06F 16/2291 |
| | | | | 707/755 |
| 2014/0172456 A1* | 6/2014 | Qian | .................... | G06F 16/345 |
| | | | | 705/3 |
| 2016/0034514 A1* | 2/2016 | Singhal | .............. | G06F 16/9535 |
| | | | | 707/706 |
| 2016/0232143 A1* | 8/2016 | Fickenscher | .......... | G06F 16/955 |
| 2016/0292248 A1* | 10/2016 | Garcia | ................ | G06Q 10/067 |
| 2017/0046487 A1* | 2/2017 | Tran | ...................... | G16H 50/70 |

\* cited by examiner

SYSTEM AND METHODS FOR IDENTIFYING, AGGREGATING, AND VISUALIZING TESTED VARIABLES AND CAUSAL RELATIONSHIPS FROM SCIENTIFIC RESEARCH

CROSS-REFERENCE TO RELATED APPLICATIONS

This U.S. non-provisional application claims the benefit of U.S. provisional application No. 62/336,578, filed on May 14, 2016, the contents of which are expressly incorporated by reference herein.

STATEMENT REGARDING FEDERALLY SPONSORED RESEARCH OR DEVELOPMENT

This invention was made with Government support under a National Science Foundation Grant, Award No. 1622260. The Government has certain rights in this invention.

BACKGROUND

Technical Field

This disclosure relates generally to the field of generating, searching and visualizing knowledge-based models. More particularly, the disclosure relates to parsing language in scientific, technical and academic literature to extract asserted construct relationships, respond to queries thereof and visually represent query results.

Background Art

Description

In many situations, academics and other researchers want to examine a body of scientific, technical and/or academic literature to find articles most relevant to the subject matter of interest to them.

One commonly used academic search tool is Google Scholar. Google Scholar indexes research papers and other academic literature by paper-level metadata such as article and journal titles, author, and abstract. It also indexes literature by keywords (words or phrases). These search tools typically select and rank literature by predicted relevance based on user-specified search criteria constructed using keywords, and in some cases based on search constraints indicated by boolean operators and/or proximity operators between such keywords.

A researcher interested reviewing, for example, literature discussing the effects of "product variety" on consumers, may use Google Search.

FIG. 1 illustrates one embodiment of a screen capture of a first page of a Google Scholar results in response to using "product variety" and "consumer" together in the search input for Google Scholar. As a result, documents are ranked by predicted relevance based on this search string. The algorithms may be complex, but the predicted relevance ranking may be based on factors such as whether each document includes all the search terms, the location and frequency of each search terms in the document, and perhaps the relative proximity of the search terms. This method works to some extent in producing search results that may happen to be associated with the subject matter intended to be represented by these search terms.

For example, the first Google Scholar result shown in FIG. 1 is a paper entitled "Consumer Surplus in the Digital Economy: Estimating the Value of Increased Product Variety at Online Booksellers." This article appears to be related to the effects of product variety on consumers in the context of online booksellers.

The sixth Google Scholar result shown in FIG. 1 is a paper entitled "Consumer Information, Product Quality, and Seller Reputation." While this article includes both "product variety" and "consumer" search terms, it mentions "product variety" in the negative, stating the author is looking at product quality "as opposed to" product variety. Thus, this article may be irrelevant to a researcher looking for papers examining product variety.

Figure 2:
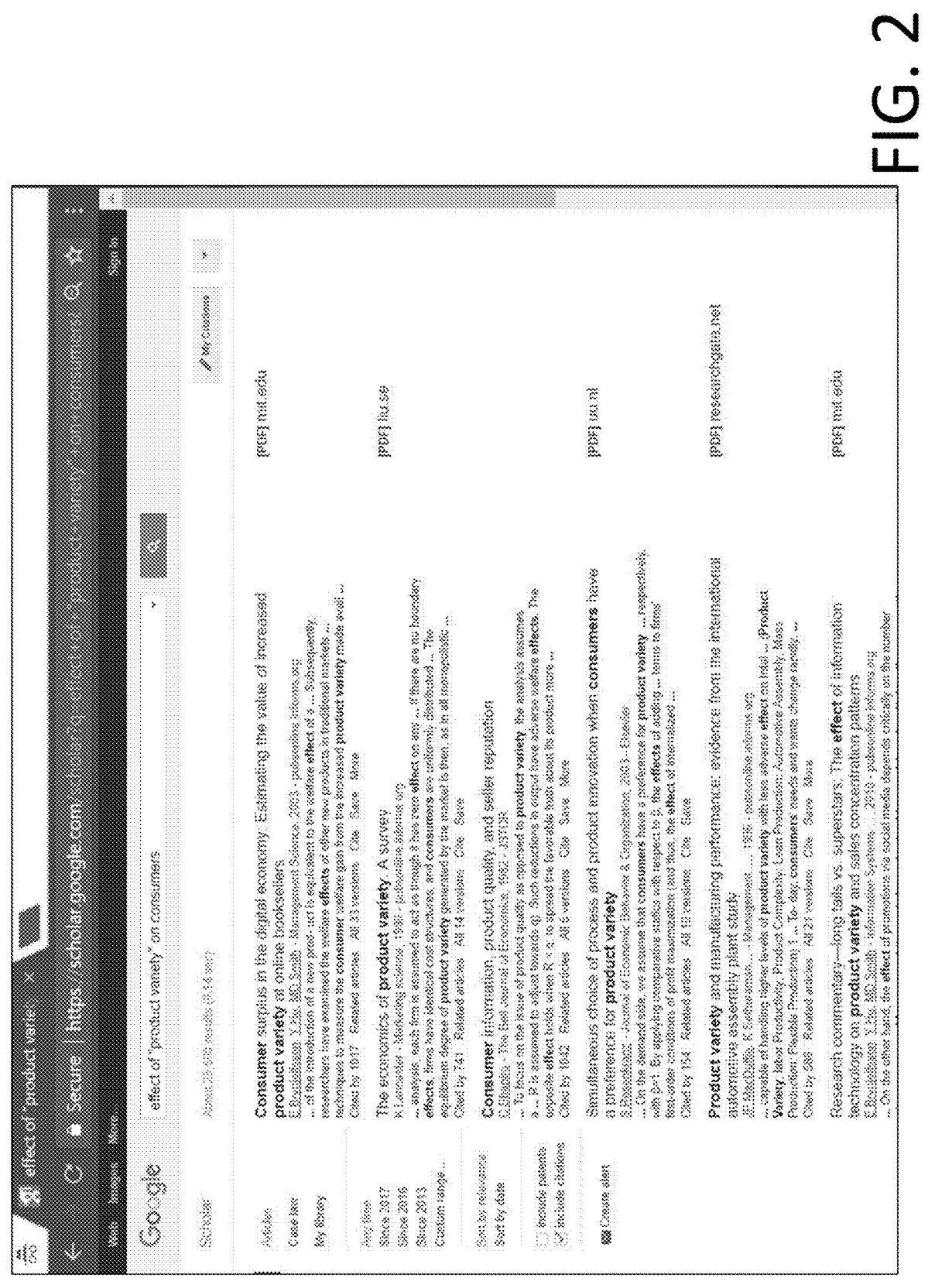

FIG. 2 illustrates one embodiment of a screen capture of a first page of a Google Scholar results in response to a more specific query than the one above: "the effect of 'product variety' on consumers". This more specific query may have the unintended consequence of excluding relevant results that use slight semantic deviations from the expression of the relationship between search terms.

In this example, the first search result is the same as the previous example.

However, the sixth Google Scholar result shown in FIG. 1 is a paper entitled "Research Commentary—Long Tails vs. Superstars: The Effect of Information Technology on Product Variety and Sales Concentration Patterns." This paper appears to examine the effects of other constructs on product variety rather than the effect of product variety on other constructs. This researcher may be interested in only the latter relationships with product variety.

When search results are under inclusive, a researcher may get an incomplete picture of the existing literature, potentially causing the researcher to unintentionally duplicate previously established findings in the literature or draw incorrect conclusions about the body of literature. When search results are over inclusive, a researcher may spend a significant amount of time reading through literature to exclude those that are not relevant.

What is needed are systems and methods to better characterize, classify, and search scientific, technical and academic literature.

DESCRIPTION OF THE DRAWINGS

FIG. 2 is a screen capture of a first page of Google Scholar results for the search term "the effect of 'product variety' consumer"

DETAILED DESCRIPTION

Figure 1:
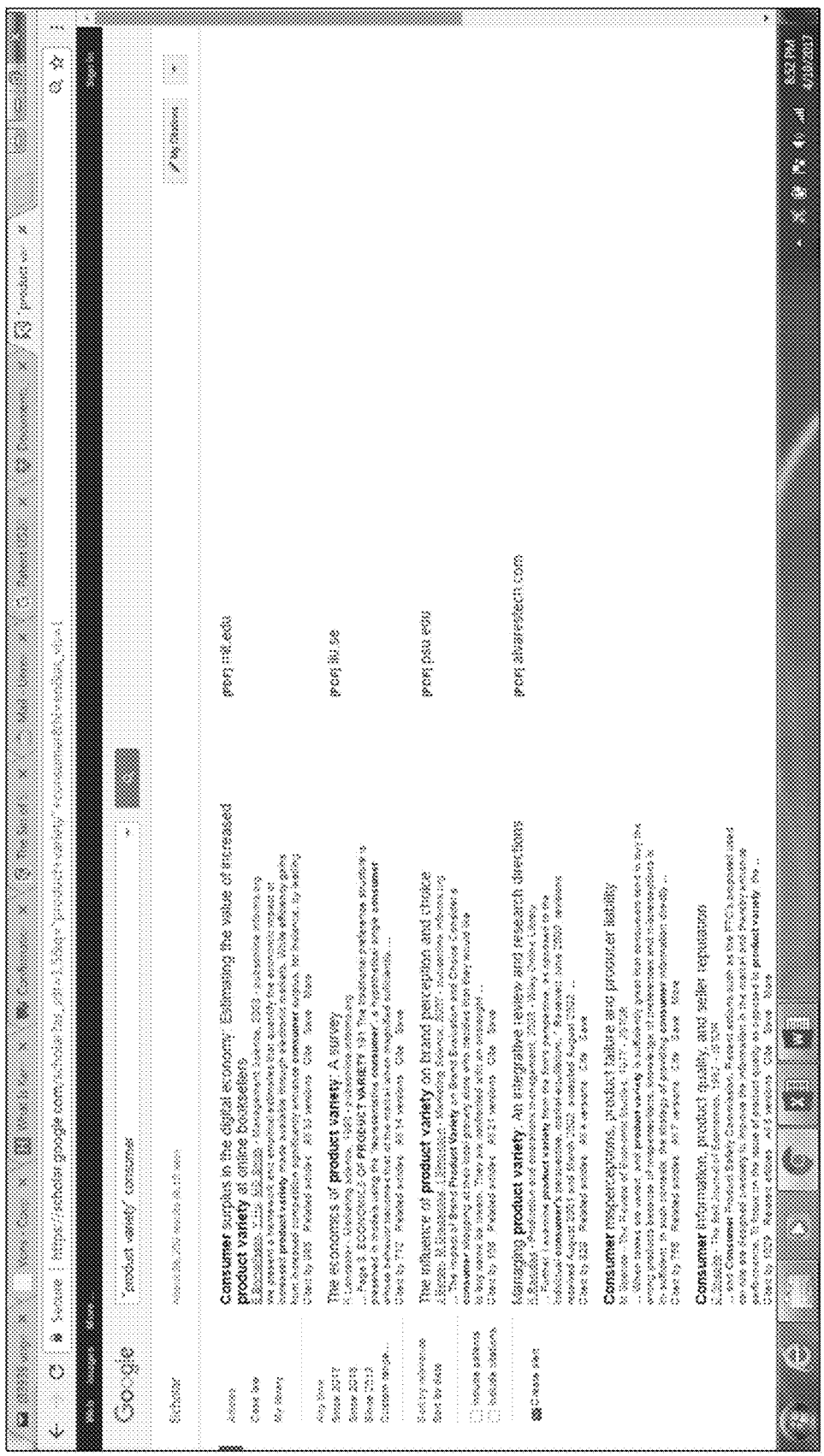
FIG. 1 is a screen capture of a first page of Google Scholar results for the search term "'product variety' consumer"
Figure 3:
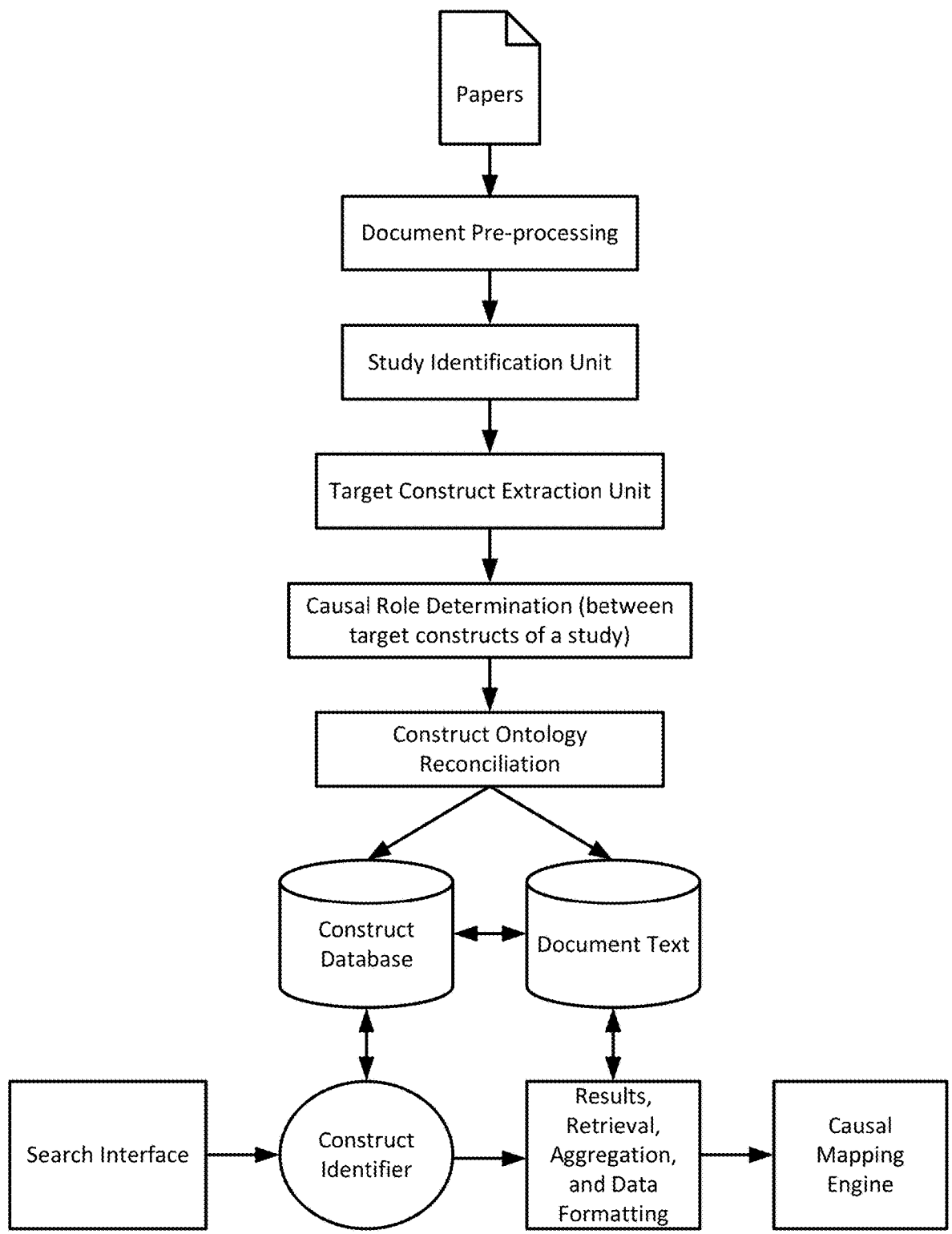
FIG. 3 illustrates one embodiment of a system for searching constructs and causal relationships between constructs.

This disclosure relates generally to the field of generating, searching and visualizing knowledge-based models. Various examples of embodiments will be described below with reference to the drawings. The following exemplary embodiments are illustrative and are not to be construed as limiting.

Researchers typically express their investigations in terms of hypotheses and other construct relationships. The subject matter of such investigations into hypotheses and construct relationships are common in the social and behavioral sciences, but are also used extensively in other scientific and technical disciplines. These investigations may be reported in academic journals and other magazines, books, reports, documents, and other references. These information sources will be collectively referred to herein as papers or literature, but it will be understood that these papers are often embodied in one or more physical forms. For the purposes described herein, physical papers are preferably converted to electronic documents for computer processing.

A construct can be defined as construct or category of interest that is studied and empirically tested in a discipline, particularly in a social science discipline. (e.g., "product variety" or "consumer attitudes" would be considered constructs that are often researched in consumer psychology). A "construct" is often synonymous with "variable," though variables can also be thought of as the representation of a construct within a specific study.

A construct relationship may be a hypothesis tested according to a valid experimental design which may allow for a scientifically-based inference to be drawn as to causality, even if the conclusion based on the results of that testing does not support a finding of causality. However, a construct relationship as used herein may also include less scientifically rigorous investigations into relationships between constructs. In some embodiments, a construct relationship may include investigations to determine correlations and other associations between constructs where causation is not established, or even evaluated.

When researchers search the academic literature, they are generally interested in finding papers that investigate similar or related hypotheses or construct relationships. These constructs are often represented as variables within the context of a particular empirical investigation. There may be multiple investigations (also referred to as studies) in a paper.

Some hypotheses are descriptions of causal relationships between two or more constructs. Hypotheses typically indicate which of one or more construct(s) predict or influence one or more other constructs (i.e., the direction of the causal effect) and how changes in one or more predictors (often represented based on independent variables) are related to changes in one or more outcomes (often represented as dependent variables).

In some hypotheses, there are constructs that are moderator constructs (often represented with moderator variables) that affect the sign and/or the strength of the relationship between at least one independent construct and at least one dependent construct. A moderator construct is said to interact with an independent construct when the addition of the moderator construct changes the effect of the independent construct on the dependent construct.

In some hypotheses, there are constructs that are mediator constructs (often represented with mediator variables) that explain the relationship between at least one independent construct and at least one dependent construct, meaning that they are the mechanism that makes the relationship happen. When a mediator causes complete mediation it means that, in the absence of the mediator's effect, there would be no causal relationship between an independent construct and an otherwise dependent construct. For example endorphins are a mediator construct in the relationship between chocolate and mood; chocolate (independent construct) increases a person's mood (dependent construct) because eating chocolate releases endorphins (mediator construct).

Mediator constructs can also interact with a moderator construct, such that a mediator's effect on the relationship between an independent and dependent construct is affected in sign and/or strength by the presence of a moderator construct. Multiple hypotheses can be integrated into a causal framework (sometimes referred to as a conceptual framework or simply a framework). This causal framework is a network of causally interlinked constructs that together provide a quick overview of the causal relationships examined with regard to one or more constructs, or of all the moderating and mediating relationships examined within the context of the causal relationship between two or more constructs. This causal framework may be used to organize a literature review so that various papers are associated with particular constructs or particular relationships between constructs. The causal framework may be used to generate a visual representation that conveys a summary state of the literature with respect to the constructs that are incorporated into the causal framework.

The causal framework may be also be used to generate a visual representation of the hypotheses that were tested in a paper or in a study within a paper, which together form the causal model for that paper or study.

Natural Language Processing & Machine Learning

Step 1: Study Identification

Identify Studies in a Paper

This will be based on the study heading (which typically contains a descriptive word such as "study" or "experiment" and an identifying number, e.g., "study 1") along with other identifying data such as the line breaks between the study title and other paper sections The underlying logic is that each study will have a unique heading, that the studies in a paper are arranged back-to-back in a paper (such that a particular study ends right before the heading of the next study starts, and that the last study ends right before the general discussion section of the paper, which is typically marked by a heading such as "general discussion," "conclusion," or "summary")

Step 2: Identification of the Study Sections & Sentences

The following sections of a study will be identified:

All the section headings/subheadings (whereby a section heading/subheading is a piece of text that is typically not a fully-formed grammatical sentence, and which is separated from the section it refers to either by one or more line breaks, or by a period followed by a full sentence; differentiating between a section heading and sub-heading is not really necessary, we're simply using both for semantic comprehensiveness)

All the tables and figures, along with their corresponding headings

All the hypotheses present in a study, whereby a hypothesis has the form of a block of text separated by line breaks from the rest of the text, and which typically starts off with either "Hypothesis" or "H" followed by a number, and is followed by a colon.

The study gets parsed into individual sentences

Step 3: Identification of Variable Spans and Key Structures (at the Sentence Level)

The model would parse each sentence at a time (whereby section headings could also count as sentences) to identify variable spans and key structures.

Using a rule-based approach (where the model is being provided with a set of pre-defined rules that specify the key structures), a pure machine-learning approach (where the model is trained on a training set and learns to recognize key structures), or a combination thereof, for each sentence the model would identify whether the sentence contains any variables and/or key structures.

Key structures in a study are textual structures that help identify the causal role of one or more causal variables in a study, and which can be part of a sentence or a heading Key structures always appear in combination with one or more variables, but variables do not always appear in combination with a key structure Heading-based key structures declare the types of variables that will be discussed in the section to which the heading pertains If a section heading contains phrases like "independent variables" or "dependent variables," the system will infer that all the variables that are discussed in that section will be of the causal role specified by the section heading Sentence-based key structures contain one or more variables along with specific keywords or expressions that declare or signal the causal role of one or more variables, or the causal relationship between two or more variables, e.g., Declarations of causal roles: "the independent variables were variables A and B" or "variable A served as independent variable"

Keyword-based signaling: e.g., a sentence that associates a variable with a "stimulus," with being "manipulated," having certain "conditions," or being a certain type of "factor" suggest that that variable is an independent variable Expression-based signaling: e.g., a sentence that contains expressions of the form "2 (variable A: level 1 vs. level 2)×2 (variable B: level 1 vs. level 2) design" suggest that variables A and B are independent variables; "an ANCOVA on variable C" suggests that variable C is a dependent variable; "the effect/impact of variable A on variable C" suggest that variable A is an independent variable and variable C is a dependent variable (within the same causal relationship); "an explanation of an effect through variable D" suggests that variable D is a mediator The above is simply one embodiment of the approach we can take. The model can also be configured to ingest not a sentence at a time, but a specific number of words at a time, a paragraph at a time, a study at a time, or the entire document at a time. Also, in order to identify these key structures, several machine learning approaches can be used, including Conditional Random Fields, Word/phrase/paragraph vectors, Logistic model trees, Support vector machine, Shallow and Deep/recurrent artificial neural networks, or combinations thereof. Moreover, machine learning model used does not need to rely on a pattern recognition approach in order to identify the key structures discussed above; any approach would work as long as the model takes as input words (at the level of a word sequence of a particular length, a sentence, a paragraph, a study, or a document) and provides as output variables and their causal roles.

Step 3-1: Sentence Categorization

Each sentence would be categorized as:

Not containing any variables (e.g., "This study used a similar design as Study 2" or "The results were replicated"); in this case the sentence gets a 'score' of 0

Containing variables, but no key structure (e.g., "We measured variable A using measure X" or "The mean for variable A was Y"); in this case the sentence gets a 'score' of 1

Containing variables, along with key structures (e.g., "The impact of variable A on variable B was non-significant" or "Variable A was manipulated the following way"); in this case the sentence gets a 'score' of 2

For all the sentences with a score of 2, the system would try to determine, based on the template that each key structure in the sentence belongs to, what the causal role is for each variable that is part of a key structure Step 3-2: Key Structure Categorization Some key structures declare a variable's causal role unambiguously (perfectly diagnostic structures), others do not (imperfectly diagnostic structures)

The perfectly diagnostic ones would be assigned a maximum confidence score (e.g., 100%), meaning that when a variable is encountered in the context of that structure, the variable's causal role can be determined with full confidence; no more information is needed from the study to determine that variable's causal role The imperfectly diagnostic ones would be assigned a confidence lower than 100%, meaning that when a variable is encountered in the context of that structure, the variable's causal role can be determined with high, but not full confidence; more corroborating information is needed from the study to determine that variable's causal role Examples of perfectly diagnostic structures: "the independent variables were variables A and B" or "variable A served as independent variable" or "we manipulated variable A" or "variable A had two levels: high and low" (which suggests that variable A is an independent variable) or "the study used a 2 (variable A: level 1 vs. level 2)×2 (variable B: level 1 vs. level 2) design"—confidence score of 100% for variable A being an independent variable Examples of mixed diagnostic structures: "the impact of variable A on variable B was significant" (which suggests that variable A is most likely an independent variable, though it can also be a covariate/control variable, and variable B is most likely a dependent variable, though it can also be a covariate; if variable A is a covariate/control variable, then variable B is necessarily a dependent variable, and if variable B is a covariate/control variable, than variable A is an independent variable);

compare this to perfectly diagnostic structure "the impact of variable A on variable B was mediated by variable D" (which suggests that variable A is definitely an independent variable, variable B is definitely a dependent variable, and variable C is definitely a mediator, because a mediator always mediates the effect of an independent variable on a dependent one)

Categorization by Exhaustiveness

Certain perfectly diagnostic key structures not only express a variable's causal role unambiguously, but they are also exhaustive in the sense that they specify all the variable of a particular causal role that appear in a study This allows the system to infer that any other, unique variables encountered outside of the context of that key structure will necessarily have a causal role other than the one specified by the key structure Examples include the following:

If a section heading contains a phrase like "independent variables," the system infers that that section contains only independent variables, and that there are no other independent variables in the study; same for all dependent variables, mediators, and covariates If a sentence contains a key structure of the type "the independent variables in this study were A, B, and C," the system infers that that structure contains only independent variables, and that there are no other independent variables in the study; same for all dependent variables, mediators, and covariates If a sentence contains a key structure of the type "2 (variable A: level 1 vs. level 2)×2 (variable B: level 1 vs. level 2)," the system infers that that structure contains all the independent variables in the study; this does not work for other types of variables, it's an expression that is specific to independent variables only Step 4: Causal Role Determination based on Key Structure Diagnosticity and Exhaustiveness The system combines the variables identified in a study with the key structures in which those variables appear to determine the causal role for each variable The variables paired with a perfectly diagnostic key structure get assigned a confidence score of 100%, meaning that when a variable is encountered in a context of that structure, its causal role can be determined with full confidence; no more information is needed from the study to determine that variable's causal role If one or more variables are paired with a perfectly diagnostic key structure that is also exhaustive, then the system infers with 100% confidence that the other, distinct variables encountered outside of that perfectly diagnostic key structure have a causal role other than the one specified by that key structure The variables paired with an imperfectly diagnostic key structure get assigned a confidence lower than 100%, meaning that when a variable is encountered in a context of that structure, its causal role can be determined with high, but not full confidence; more corroborating information is needed from the study to determine that variable's causal role For these variables, the system tries to identify at least one sentence in which that variable is paired with a perfectly diagnostic key structure; if such a structure cannot be identified, the system makes a determination of the variable's causal role by going through all the key structures paired with that variable and computing an overall probability statistic for that variable's causal role The system can learn over time that in certain key structures, variables have a certain probability of having a particular causal role, e.g., in the structure "the impact of variable A was significant," variable A is an independent variable in 80% of the cases, and a covariate in the remaining 20%; hence, it will assign a confidence score of 80% for variable A being an independent variable Other Rules for Causal Role Determination Once a variable's causal role is determined with 100% confidence in a study once, it does not change again, with the following exceptions:

studies that are poorly written (for example a variable may be declared as a covariate at some point, and then as a moderator (i.e., independent variable) later on)

mediators are sometimes expressed as DV's in the beginning of a study, and declared as mediators only later on; this issue can be solved by treating each DV as being a potential mediator, hence allowing for a dual role there Unless there is clearly contradictory information about a variable's causal role later on in a study (see above), each variable and its causal role get committed to the database Each variable gets assigned a unique ID that specifies its causal role along with an number (i.e., IV1, DV2, MD1, etc.)

Determine whether a study contains causal or correlational relationships (if, using the steps above, no variables can be identified that can be categorized as an independent or dependent variables, it's not a correlation/causation study and it will be skipped)

Step 5: Variable Categorization by Concept

Each variable in a study gets assigned to a concept retrieved from an internal or external ontology/thesaurus (whereby a concept is a standardized term that is stored in the ontology/thesaurus along with all its semantic variations (synonyms) and potentially other dimensions such as measures or related concepts)

The assignment happens by checking the variable name against the ontology and looking for a match If no match is found, the system marks the variable as "new" in the ontology, and this variable can get flagged for review by a human This approach is useful because in some cases, the system may identify two variables, for which it not have enough information to identify whether they are distinct variables or not (e.g., one sentence says "We are examining, among others, the impact of product variety on choice", the other says "We are using the same measures as in Study 1, except for the measure for product selection." Do "choice" and "product selection" refer to the same variable? Classifying each against the existing concepts in an ontology helps answer that question)

A similar approach would also be needed for identifying whether variables that have different names in different studies should be treated as the same variable (e.g., when a variable may be called "product variety" in one study and "product assortment" in another)

Variables who are assigned to the same concept in the ontology are considered the same variable, either within a study or across studies All variables successfully assigned to a construct get stored in the construct database, along with the variable's correspondence with the construct, and the study and paper it belonged to.

General Assumptions:

Unless otherwise specified, all the independent variables affect all the dependent variables in a study Unless otherwise specified, all the independent variables interact with each other in a study Every mediator is also a dependent variable; every dependent variable is hence also a potential mediator A variable (or co-occurrence of variables) that appears in all the studies in a paper is considered the main variable (or co-occurrence of variables) in that paper Construct Database A construct database contains an index of constructs that were extracted from a set of research papers or other documents. Each record in the database may be associated with a particular study. Some or all of the following information may be stored in the construct database:

A standardized construct name for each construct used in the study. The standardized name may be different the actual name used for the construct in the study.

When extracting the constructs from each document, the indexing system recognizes variations in the same or similar construct used across the studies in a single paper and across papers. For example, the construct "product variety" may be alternatively expressed as "assortment," "choice set," "set size," and "number of options." In order to map similar or identical causal relationships to each other, these alternative descriptions or synonyms of the same construct should be recognized as such, assigned to a standardized construct name in the database, and stored as an "alternative name" for that construct. In a preferred embodiment, the standardized construct name is assigned a unique construct identifier, while each alternative construct name may also have its unique identifier.

The standardized construct name may be associated with a broad range of construct names used in various studies to represent the same or similar construct. These associations may be used in the natural language processing to associate the studies using these various construct names and other semantically similar construct names under the same standardized construct name.

Constructs used in the study to refer to constructs that are conceptually, semantically, or ontologically related to an individual construct, such as subordinate constructs or superordinate constructs, may be stored as "related construct names."

Information related to how a construct is represented, manipulated, measured and otherwise used in a study may be stored in the database and referred to collectively as "construct instantiating information."

The causal role for each construct in that study.

Causal roles may include independent variable, dependent variable, moderator variable, mediator variables, control variable and covariate variable.

A document identifier that uniquely associates the information stored in the construct database with the source document that was processed to extract that construct information.

The causal relationships may be inferred from the construct names and associated causal roles stored in the construct database for a particular study. For example, if a study contains four constructs (Construct A, Construct B, Construct C, and Construct D), whereby Construct A is indexed as an independent variable, Construct B is indexed as a moderator, Construct C is indexed as a mediator, and Construct D is indexed as a dependent variable, one can deduce that the study investigated a causal relationship from Construct A to Construct D, one from Construct A to Construct C, one from Construct C to Construct D, and one from Construct B to the relationship between Construct A and Construct D. In some embodiments, explicit information about the causal relationships between these constructs have been examined for a study may be stored in the database.

In a preferred embodiment, the construct database is populated using Natural Language Processing and Machine Learning methods (collectively referred to as "Natural Language Understanding" or "NLU") to automatically extract the aforementioned information from a set of papers, and then store them in the Construct Database. In some embodiments, some or all the information are originally specified or correctable using manual entry.

The construct database may also store, for each paper, metadata, such as author, title, publication year, journal name, other citation information, journal rating, number of citations to the article. This metadata may be referred to herein as paper-level metadata in that it describes information about the paper more generally. In some cases, this is distinguished from study-level metadata such as construct names and relationships, that are associated more specifically with a study described in the paper. There may be multiple studies in a paper. In some embodiments, the metadata may include other subject matter classification information, such as the industry or vertical to which the study pertains. Some metadata may be extracted from fields within the paper, or automatically determined based on a natural language analysis of the paper.

Search Interface

In a preferred embodiment, researchers can search based on constructs and causal relationships between constructs for studies in the literature.

Specifically, the results are represented in the form of causal maps that depict the individual constructs and causal relationships that are relevant to a user's search query. Such results are more granular than paper-level search results, since they visually represent study-level search results within each paper, represented in terms of the constructs and relationships examined in those studies. Each paper may contain multiple studies. In some embodiments, these causal maps are aggregated across multiple studies within a paper. In some embodiments, these causal maps are aggregated across multiple papers representing a body of literature about a topic of interest.

The Search Interface allows a user to query information about particular constructs, particular causal relationships between constructs, and particular papers. Users can enter construct-related queries and relationship-related queries by specifying one or more of the following: (1) one or more construct(s) of interest; (2) one or more causal roles for one or more of the specified construct(s), and (3) any additional filtering criteria based on metadata and information stored in the Construct Database. Users can also search directly for a paper of interest by specifying paper-level metadata that combines one or more of the above mentioned construct-based criteria with one or more of the metadata criteria.

The specifications indicated above may be implemented in various ways, which include, but are not limited to, a user selecting a particular specification from a pre-populated list (for example, for (c), the pre-populated list can include the options "independent variable," "dependent variable," "moderator," "mediator," "control variable," "covariate") or entering that specification in an open-ended format.

Query Engine

The Query Engine matches the input provided by the user via the Search Interface against the information stored in the Concept Database and produces a set of results that are subsequently displayed via the Search Results Interface. The Query Engine performs construct identification and result retrieval and assembly. The Query Engine can also be configured to accept input from components other than the Search Interface, whereby such components can be either internal or external to the system described in this patent application. In one embodiment, the Query Engine can be configured to accept input from a component that displays a pre-populated list of constructs, for example an ontology of constructs from a particular domain. A user selecting one or more constructs from that list would initiate a command to the Query Engine similar to that produced when the user specifies the names of those constructs (without specifying the constructs' causal role) via the Search Interface.

Construct Identification

If a construct of interest is specified in an open-ended format (meaning that the user enters a particular construct name into the search field), the Query Engine initiates a semantic matching process that attempts to match the user-specified construct name against a corresponding construct name stored in the Construct Database. The construct name identified as matching may be an exact or a close match. For example, if a user specifies "assortment of different products" as the construct name, the Query Engine, upon searching the Construct Database, might find this name to be a match for the construct name "product assortment." Once a matching construct name has been found, the Query Engine determines from the Construct Database the construct name that is associated with that particular name. For example, it might determine that "product variety" is the construct name that includes "product assortment" among its set of construct names. "Product variety" would hence be identified the construct most relevant to the user's initial query.

Result Retrieval & Assembly

Once the user has submitted a query, and the construct identification has been successfully completed, the Query Engine retrieves from the Construct Database all the information pertaining to the construct(s) identified as relevant to the user's query. Then, it assembles this information to be used by Search Result Interface. Such information includes all the corresponding construct names, related construct names, instantiation information, and causal roles indexed with reference to that construct across relevant papers, along with the paper-level metadata corresponding to each relevant paper.

Search Result Interface

The Search Result Interface displays the output produced by the Query Engine. The output is shown either in a visual or textual format, or as a combination of both depending on each user's preference and the type of task the user wants to complete. In a preferred embodiment, causal frameworks are represented in a visual format in the form of causal maps generated by the Causal Mapping Engine. Papers that are predicted to be relevant to a user's query are shown in a text-based format generated by the Textual Listings Module. One embodiment of the Causal Mapping Engine and Textual Listings Module are described below.

Search Result Interface: Causal Mapping Engine

The Causal Mapping Engine uses the output produced by the Query Engine to render graphic and interactive causal maps of all the constructs and causal relationships that are relevant to a user's query (whereby the totality of causal relationships that are relevant to a particular construct or topic form a conceptual framework for that construct/topic). It represents the constructs that are part of a causal framework according to their functional role within that framework, and links the visually presented information back to the research papers that were used to generate the map of the causal framework.

The logical process of mapping out a causal framework involves inferring, based on the Query Engine output, which constructs and causal relationships to represent in the framework (i.e., the "relevant" constructs and causal relationships), visually rendering each of those constructs and relationships, and configuring the visual indicators that allow a user to interact with each construct and relationship (by either visually exploring that construct/relationship in more depth, or viewing a list of the papers that are relevant to that construct/relationship). This module's visual rendering and interactivity will be discussed in more detail in subsequent sections.

In a preferred embodiment, a graphical symbol is shown to represent each construct with a line between constructs to represent a relationship between constructs. In some embodiments, a count of the articles associated with each construct is numerically indicated on or adjacent to the graphical symbol for the construct. In some embodiments, a count of the articles associated with each construct relationship is numerically indicated on or adjacent to the line representing the relationship between the constructs. Thus, one can visualize the volume of literature associated with each aspect of the causal framework.

In some embodiments, causal maps can show construct relationships investigated in a single study (also referred to as a study-level causal framework, or a single-study map). In other embodiments, causal maps show construct relationships for multiple studies within a paper (also referred to as a paper-level causal framework, or a single-paper map). In yet other embodiments, causal maps show construct relationships across multiple papers (also referred to as a cross-paper causal framework, or an aggregated map).

A cross-paper causal framework is generated using a cross-paper aggregation process. It aggregates the extracted construct relationships from many research papers into one causal framework that is generally more extensive than has been formalized or empirically tested as a whole in previous research.

When a cross-paper aggregation is generated, the Causal Mapping Engine also generates what can be called "research volume" indicators, which, in the most basic form, could be thought of as paper counts. In a preferred embodiment, the causal mapping engine for each construct and construct relationship that are part of a causal framework, the engine calculates the number of unique research papers relevant to that construct and/or causal relationship. The Causal Mapping Engine counts the papers in the Construct Database that investigates each construct incorporated in the cross-paper causal framework, and displays those numbers in such a way as to be associated with their respective constructs in the cross-paper aggregate map. The Causal Mapping Engine counts the papers in the Construct Database that investigates each construct relationship incorporated in the cross-paper causal framework, and displays those numbers in such a way as to be associated with their respective construct relationships in the cross-paper aggregate map. In a preferred embodiment, this association is conveyed by positioning the number on or adjacent to the visual feature representing the corresponding construct or construct relationship.

Instead of a paper count, other types of research volume indicators may be used to indicate other important aspects of particular constructs and construct relationships. For example, a research volume indicator may be computed as an algorithm that takes into consideration factors such as a score of the paper's relevance to the query, the number of downloads for that paper, the paper's publication recency, and the reputation rating of the journal in which the paper was published.

In a preferred embodiment, a causal map is a diagrammatic representation of the constructs relevant to a user's query, represented by graphical icons with textual descriptions of the construct, and the causal relationships between such constructs, represented by lines or arrows between such constructs.

In a preferred embodiment, an aggregated causal map includes visual and/or textual indicators showing the number of papers associated with each construct or construct relationship. By clicking on the number or the graphical symbol associated with a construct (e.g., an oval) or a construct relationship (e.g., a line), the papers associated with such construct or construct relationship are presented in a textual listing. In some embodiments, multiple constructs and/or construct relationships can be selected simultaneously from the aggregate causal map to create a textual listing that include the papers that match the corresponding subset of papers within the aggregated causal map.

Causal Mapping Engine: Visual Rendering Function

The Causal Mapping Engine visually represents each relevant construct once.

Constructs are rendered as clickable graphical objects with associated text based description visually associated with the graphical object. These graphical objects are referred to as "construct nodes."

Construct relationships are rendered as the corresponding causal relationships between constructs as clickable paths (referred to as "relationship paths"), Visual indicators for the research volume and for the list of papers that correspond to each construct or relationship as clickable numbers or icons are displayed in the vicinity of their corresponding construct node or construct relationship path.

The Causal Mapping Engine can render several types of maps, as defined below, including: construct maps, relationship maps, model maps, and meta-analysis maps.

Construct maps assume that a construct of interest has been specified by the user (via the Search Interface or through some other signal, like clicking on a construct node inside a map). That construct is shown as a central node in the map, meaning that it is causally linked via relationship paths to all other constructs shown in the map. It may also contain some visual indicators that make this construct stand out from other constructs displayed in the map. This kind of map usually shows only relationships that involve independent and dependent variables, though other types of variables could be represented, too. Construct maps are aggregate maps, in the sense that they aggregate causal relationships across papers, and render research volume indicators for each construct and relationship examined across those papers.

FIG. 4

Figure 4:
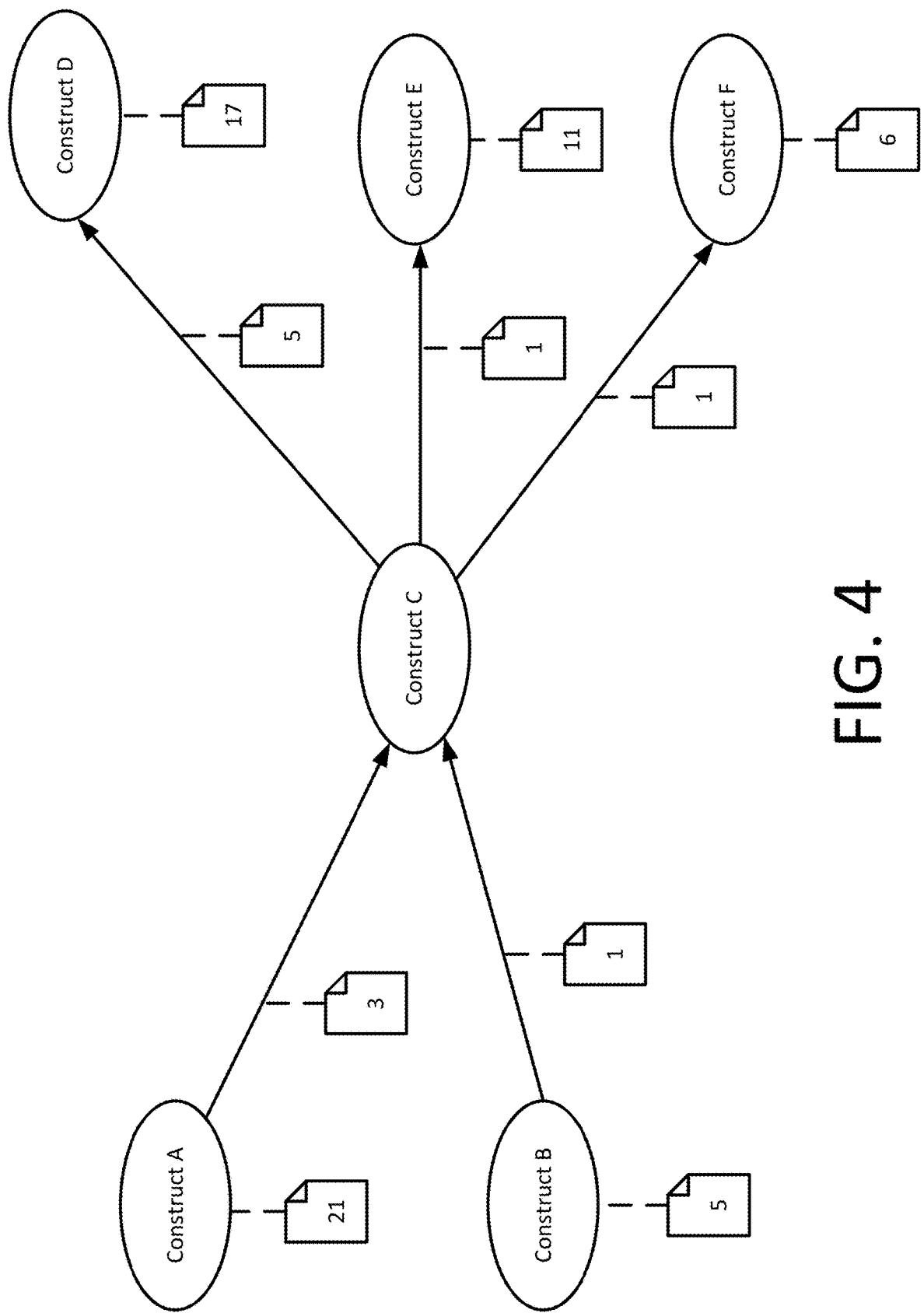
FIG. 4 illustrates one embodiment of a schematic representation of a construct map.
Figure 5:
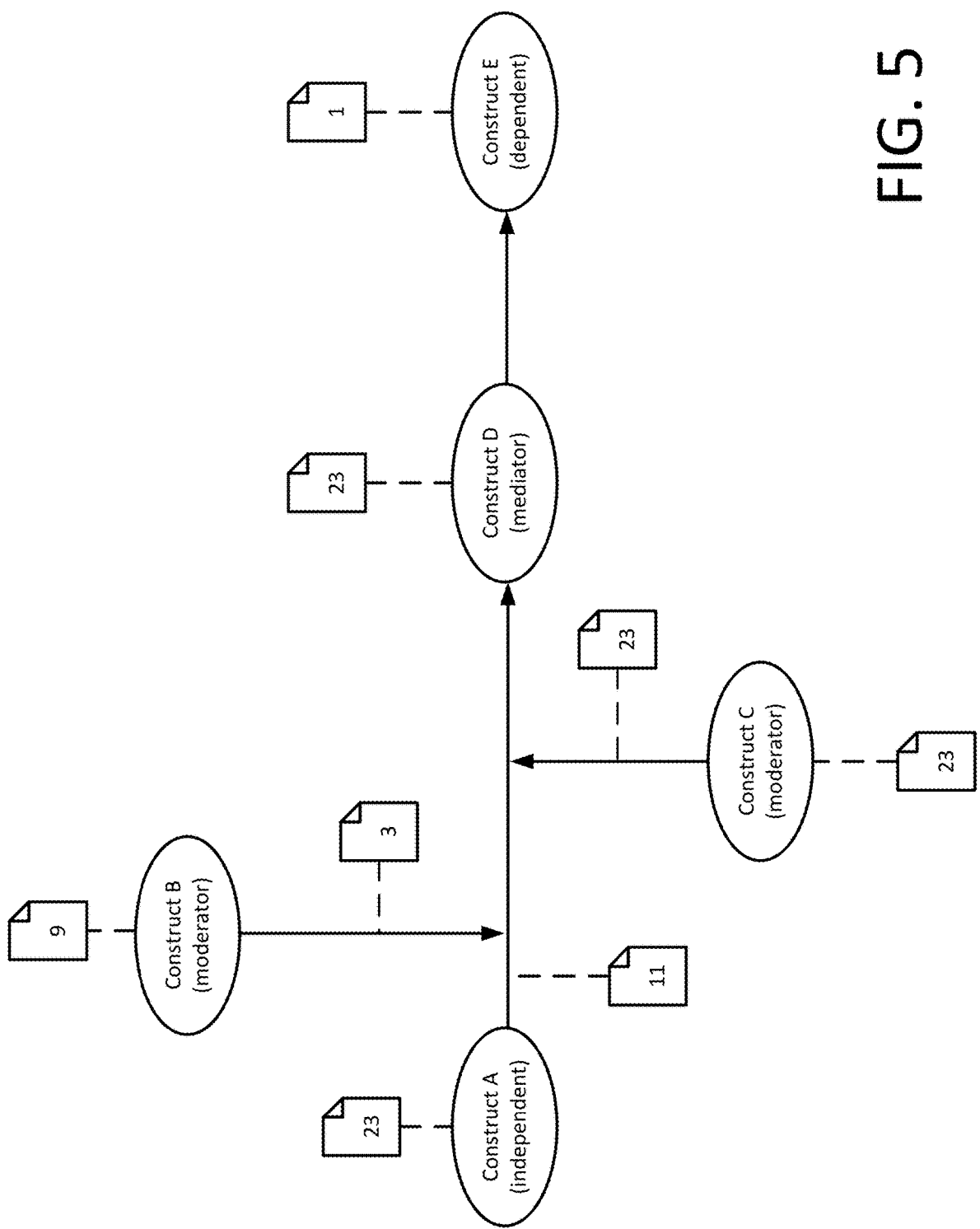
FIG. 5 shows one embodiment of a schematic representation of a relationship map.

Thus, an example of a causal map for Construct C (and its relationships with Constructs A, B, D, E, and F) could look as shown in FIG. 4 below: Visual representation of a construct map that has "Construct C" as the central node. Construct C is a dependent variable in the relationships between Construct C and Constructs A or B, and an independent variable in the relationships between Construct C and Constructs D, E, or F.

The numbers shown next to each construct and relationship exemplify the research volume for the corresponding construct or relationship (whereby the actual values are for illustration purposes only).

FIG. 5

Expanded relationship maps assume that a causal relationship of interest has been specified by the user (via the Search Interface of through some other input, like clicking on a relationship path inside a construct map). Expanded relationship maps show the endpoints of a specified relationship (i.e., the independent and dependent variable) along with all intermediary variables (i.e., mediators, moderators, and possibly control variables/covariates) examined within the context of the relationship. These maps do not necessarily have a central node; instead the causal relationship of interest represents the central linkage that ties all the other relationships together. They may also contain some visual indicators that make this relationship stand out from other relationships displayed in the map. Expanded relationship maps are aggregate maps, in the sense that they combine relationships across a set of relevant papers and also render research volume indicators.

Expanded relationship maps follow the typical representation conventions used in social science research. As an example, the relationship between constructs A and E, which involves the following constructs and causal roles: A (independent variable), B, C (moderators), D (mediator), and E (dependent variable), would be visually represented as follows:

Visual representation of a relationship map for the relationship between Construct A and Construct E, which includes the following constructs and their causal roles: Construct A—independent variable, Constructs B, C—moderators, Construct D—mediator, Construct E—dependent variable.

The numbers shown next to each construct and relationship exemplify the research volume for the corresponding construct or relationship (whereby the actual values are for illustration purposes only).

FIG. 6

Model maps show the entire causal model typically tested within a study or paper of interest (though they might also represent a conceptual framework aggregated across multiple papers). They are a hybrid between a construct map and a relationship map, do not require a central node or central linkage, and they can be either aggregate maps or single study/paper maps. An example of a (single-study) model map is shown below.

Model maps show the entire causal model typically tested within a study or paper of interest (though they might also represent a conceptual framework aggregated across multiple papers). They are a hybrid between a construct map and a relationship map, do not require a central node or central linkage, and they can be either aggregate maps or single study/paper maps. An example of a (single-study) model map is shown below.

FIG. 7

Figure 7:
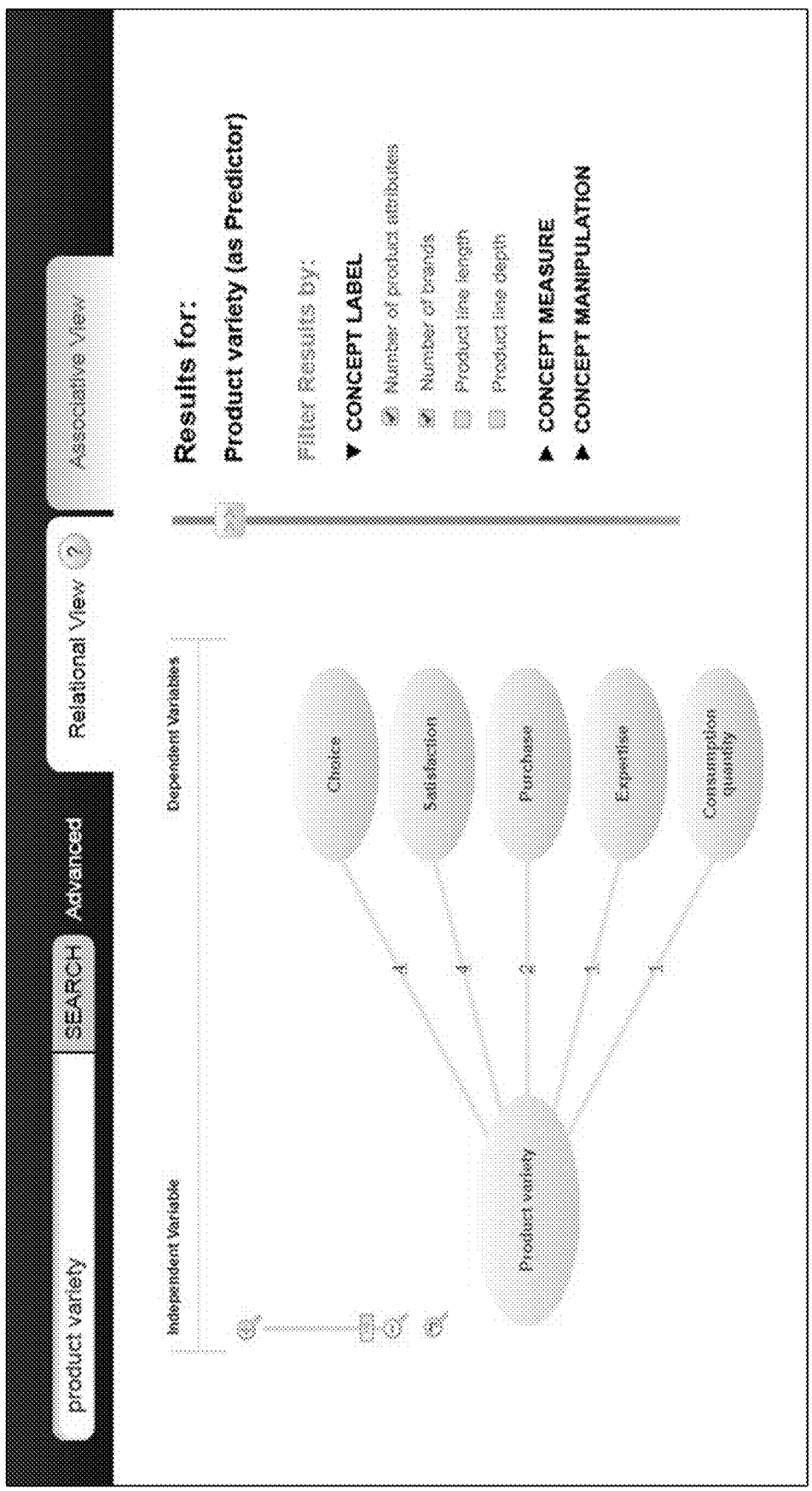
FIG. 7 illustrates one embodiment of user interface including a visual representation of a construct map.
Figure 8:
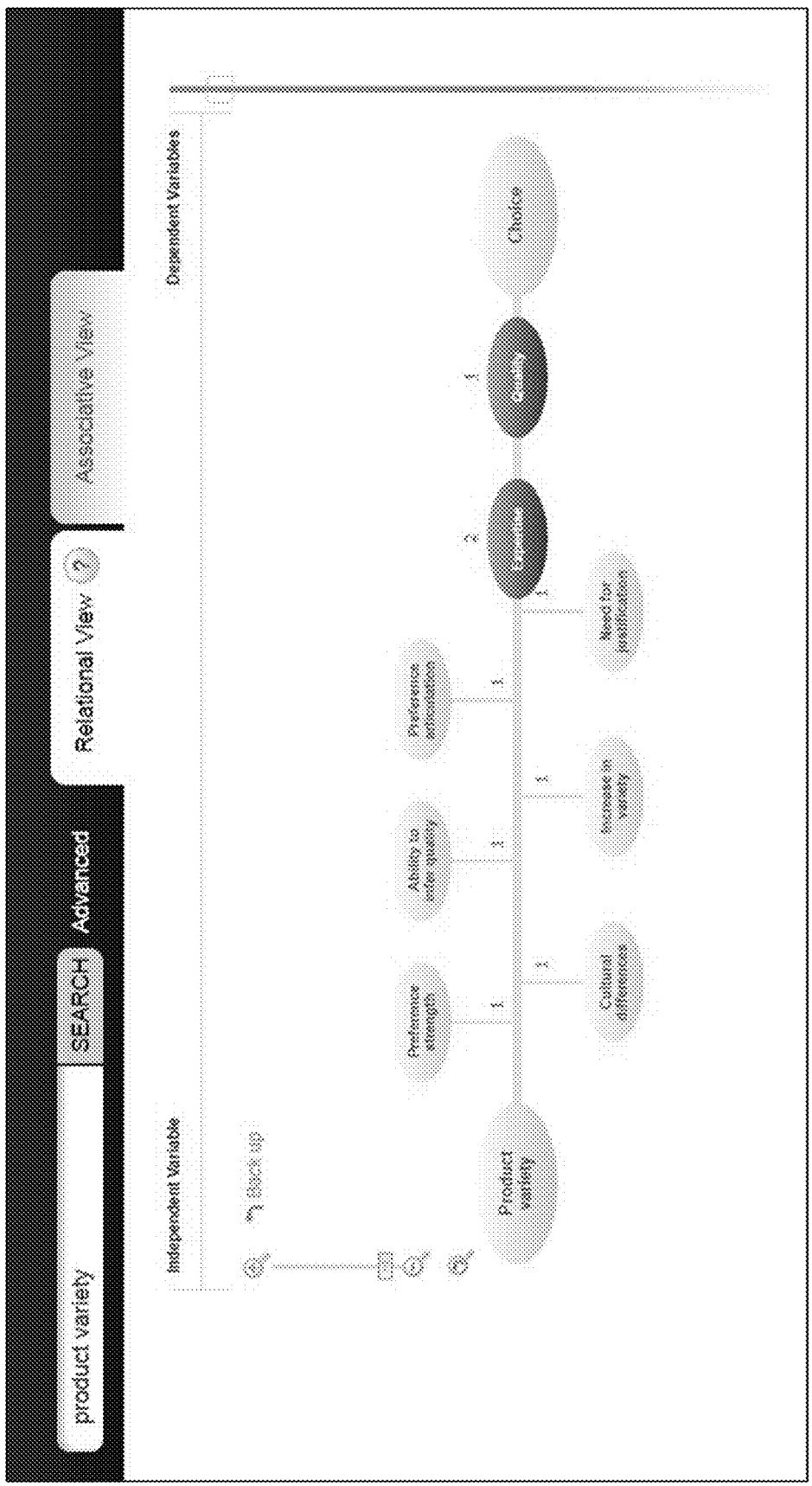
FIG. 8 illustrates one embodiment of user interface including a visual representation of a relationship map.
Figure 9:
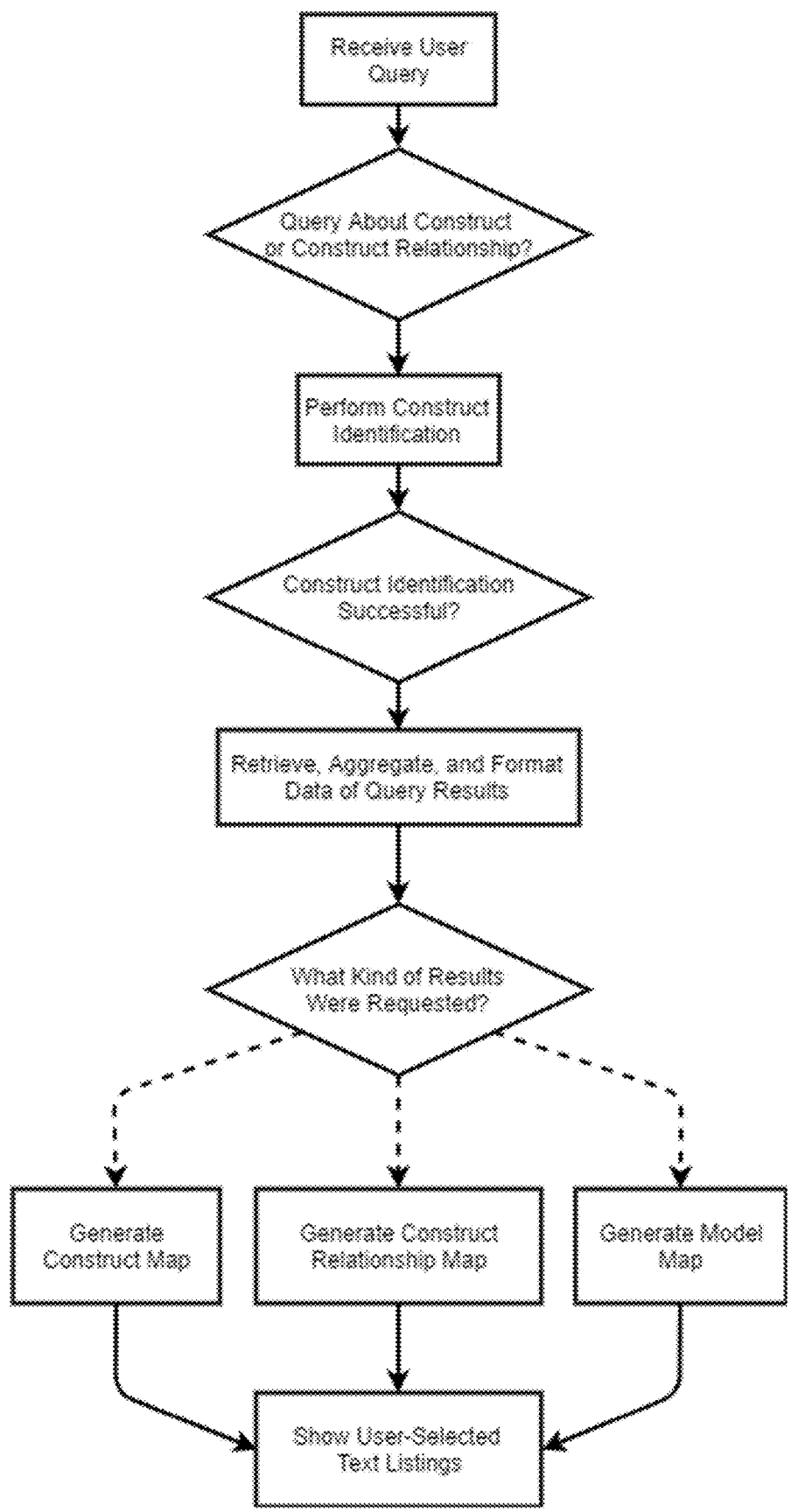
FIG. 9 shows one embodiment of a process for performing a user query.
Figure 10:
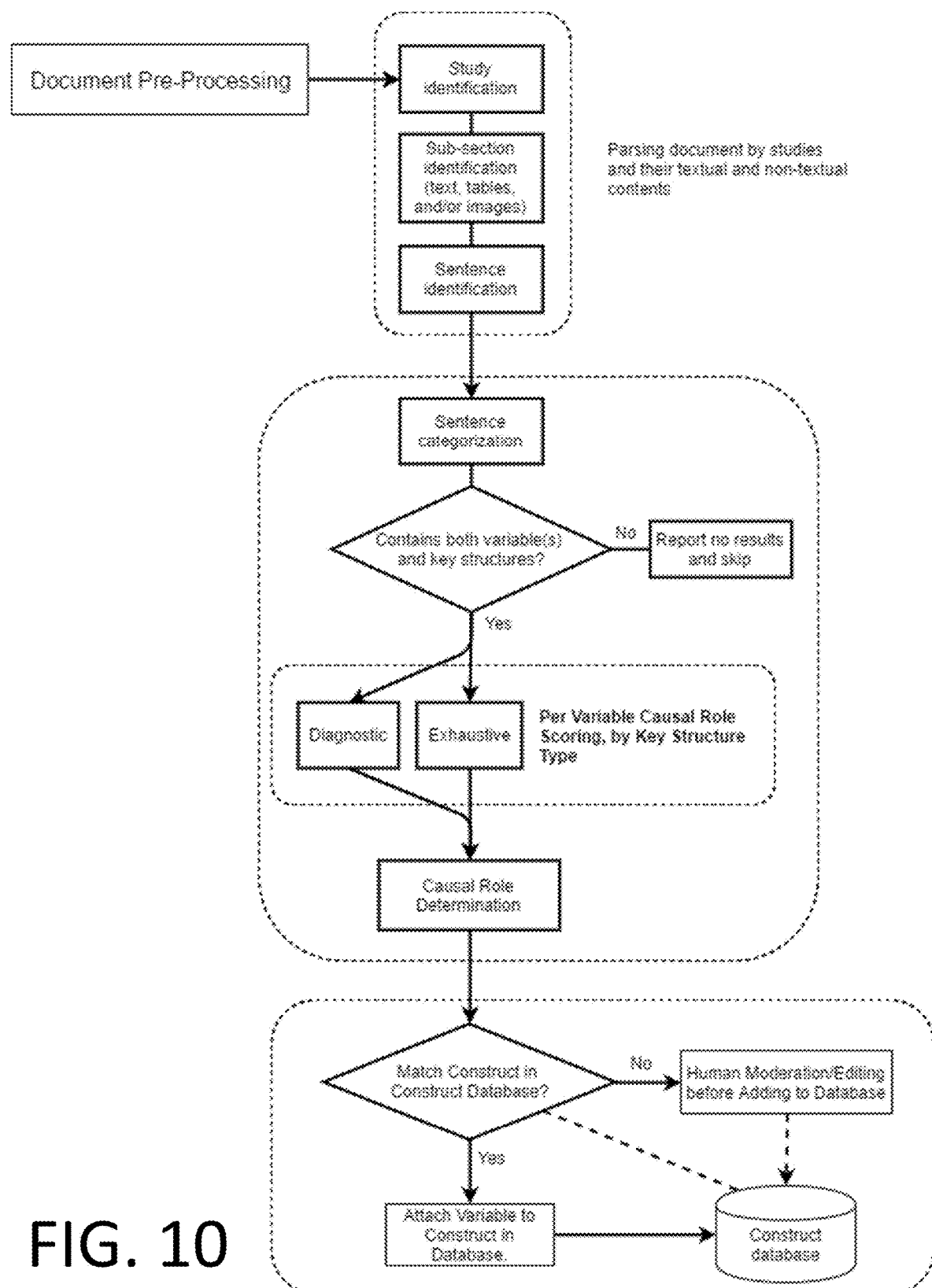
FIG. 10 shows one embodiment of a process for extracting constructs and asserted causal relationships.

FIG. 7: Construct map for "product variety."

Causal Mapping Engine: Interactive Affordances

Map-to-Map Navigation. A central characteristic of the causal maps produced by the Casual Mapping Engine is their interactivity. This interactivity is primarily aimed at allowing the user to engage with each construct or relationship of interest directly within a causal map.

Each construct node or relationship path in a map (hereby referred to as "elements of the map") is linked to (a) a map that conceptually relates to that element, and (b) a list of all the papers that have examined that particular element. As a result, users interact with an element of a map by visually exploring it in more depth, and/or by retrieving its list of relevant papers.

The elements of a Causal Map are configured to be clickable, such that clicking on any of them can result in the following:

Clicking on any construct node (or a visual indictor associated with that node) opens up a construct map for that particular construct.

Clicking on any relationship path (or a visual indictor associated with that path) opens up a relationship map for that relationship, wherein any moderator and/or mediator variables that have been studied for potentially influencing that relationship are revealed.

Clicking on any research volume indicator that for a construct or a relationship (or another visual indicator that points to accessing a list of papers) shows a list of the names of all the papers that have investigated that particular construct or relationship.

Within this list view, clicking on any paper name indicator (or some other visual indicator) opens up a model map of that particular paper, while clicking on the indicator for the name for a study included in a paper opens up a model map of that particular study.

A new map can open in various locations. For example, it may open within the current map (by "expanding" the view of the current map), in a separate window, or in a dedicated pane adjacent to the current map. Similarly, the list of papers relevant to a particular construct or relationship may be shown in various locations such as a separate window or a dedicated pane adjacent to the current map.

An example of a construct map for the construct "product variety" is shown below.

Figure 6:
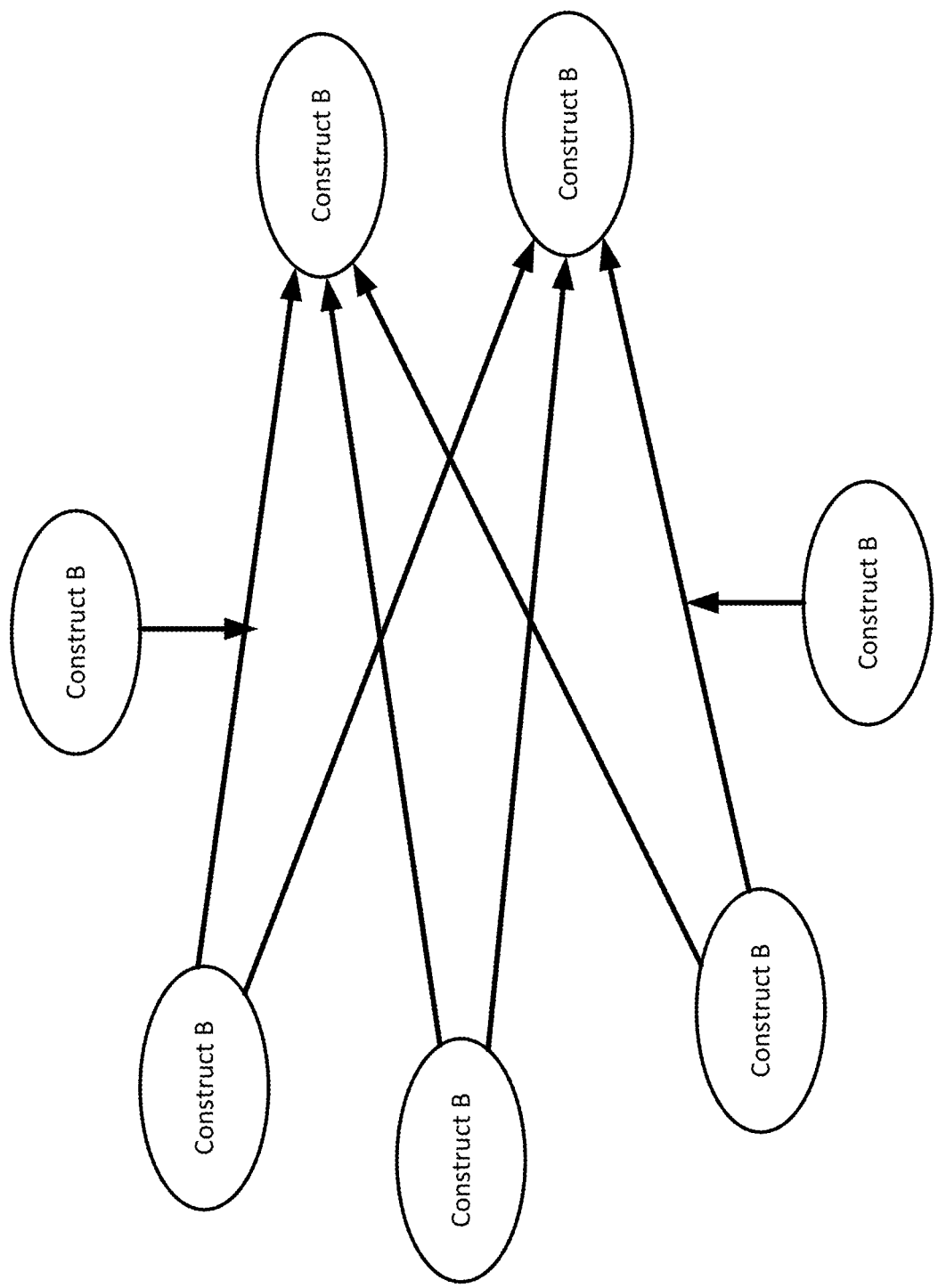
FIG. 6 illustrates one embodiment of a schematic representation of a model map.

A user interested in the relationship between product variety and choice can click on the path linking the two constructs. Doing so expands the view of that relationship and shows which additional constructs (which in this case include moderating and mediating variables) have been tested in the context of that relationship (whereby directionality and research volume for a mediating or moderating relationship are represented the same way as in the construct map in FIG. 6).

FIG. 8

Once the user has identified a mediating or moderating relationship she wishes to learn more about, she can click on the research volume indicator for the corresponding path (or another visual indictor associated with that path) to access a text-based view of the search results for that relationship, which is generated by the Textual Listings Module (described further below).

Description for the Visual Mapping System

The aggregated visual maps can be generated as detailed below.

Construct Map Generation

Whenever a user specifies only one construct of interest, the user is shown a Construct map. In more detail, the process of generating a Construct map can include the following steps:

In Step 1, the system identifies in the Construct Database all the studies in which the construct of interest has been examined in the causal role of independent variable.

In the second step, for each study identified in Step 1, the system identifies from the Construct Database (1) the paper that is associated with that particular study and (2) all the constructs that have been examined as dependent variables in that study (hereby called "outcomes"), and creates a table—aggregated across studies—that directly associates each outcome with the paper it corresponds to.

An example of such a table is shown below:

| Study 1-1 | Paper 1 | Outcome A |
| Study 1-2 | Paper 1 | Outcome A |
| Study 1-3 | Paper 1 | Outcome B |
| Study 2-1 | Paper 2 | Outcome B |
| Study 2-2 | Paper 2 | Outcome C |
| Study 3-1 | Paper 3 | Outcome A |
| Study 3-2 | Paper 3 | Outcome C |

In Step 3, based on the information generated in Step 2, the system produces a list of all the unique outcomes identified in Step 2, whereby any outcome that appears more than once in Step 2 is listed only once. For example, based on the table above, the list of outcomes would include outcomes A, B, and C.

In Step 4, for each outcome identified in Step 3, the system creates a list and a total count of all the unique papers that a particular outcome was associated with, whereby a paper that is associated with the same outcome more than once is listed and counted only once. For example, based on the table above, outcome A would be associated with a list that includes papers 1 and 3 (for a total count of 2 papers).

Steps 5-8 are repetitions of Steps 1-4, with the distinction that Step 1 identifies all the studies in which the construct of interest has been examined in the causal role of dependent variable, which leads to the generation of a list of predictors in Step 7 and a list of papers (per predictor) in Step 8. Steps 1-4 and 5-8 can be performed either sequentially or in parallel.

In Step 9, the system then displays the retrieved information in the form of a visual map, in which the construct of interest is represented as the central node in the map. On the right hand side of the construct of interest are all the constructs listed as outcomes in Step 3, and on the left hand side of the construct of interest are all the constructs listed as predictors in Step 7. The construct of interest and the outcomes are connected via visual, clickable paths (which can be pointed towards the outcomes, so as to better reflect the direction of the causal relationship), whereby each path is accompanied by an icon that provides access to the list of papers generated in Step 4 and can potentially also show the count of those papers. The construct of interest and the predictors are also connected via visual, clickable paths (which can be pointed towards the construct of interest, so as to better reflect the direction of the causal relationship), whereby each path is accompanied by an icon that provides access to the list of papers generated in Step 8 and can potentially also show the count of those papers.

Whenever a user specifies only one construct of interest, along with the causal role for that construct (i.e., either independent or dependent variable), the information shown on the construct map is reduced to the following: if the construct of interest is specified as an independent variable, then the predictors and the visual paths connecting each predictor to the construct of interest are not shown. If the construct of interest is specified as a dependent variable, then the outcomes and the clickable paths connecting the construct of interest to each outcome are not shown.

Relationship Map Generation

Whenever a user specifies two constructs of interest, along with the causal role for each construct (i.e., independent variable for one construct, and dependent variable for another), the user is shown a Relationship map. A Relationship map is a scaled-down version of a Construct map, which shows only the two constructs specified by the user, with the construct specified as independent variable shown as a predictor, the construct specified as the dependent variable shown as an outcome, and a visual path (along with the corresponding icon) connecting the predictor to the outcome. A Relationship map can be shown in a condensed format, which includes only the endpoints of a relationship (predictor and outcome), or in an expanded format, as detailed in the previous section.

The Causal Mapping Interface also includes specific features such as a Map Content Filtering feature and a Map Display Adjustment feature, which are detailed below.

Map Content Filtering. Once the content of a causal map has been generated, a user can control the overall content of that map via a Map Content Filtering feature. The Filtering feature uses the output generated by the Query Engine to display various categories of information about each construct (or causal relationship) shown in a causal map, and allow the user to narrow down the content of that map by means of selecting particular values for each category of information for that construct (or relationship). For a particular construct, the Filtering feature could, for example, list all the values for that construct's names, related construct names, and/or instantiating information (whereby those values are taken from each of the relevant studies/ papers that were returned by the Query Engine and subsequently used by the Causal Mapping Engine for generating the current causal map). Per each category of information, the user can select (via a checkbox or some other selection aid) what values she wants to see included for that category of information. For example, for the construct "product variety" and the information category "construct names," the user may see four values, "number of attributes," "number of brands," "product line length," and "product line depth," and she may de-select the last two values. Upon the user making her selection, a request is sent to the Causal Mapping Engine to automatically remove from the generated causal map all the papers that do not contain at least one study matching the user's specified criterion. This elimination can (though does not need to) result in a visually modified causal map containing a lower number of construct nodes, corresponding unique causal relationships, and/or a lower research volume for one or more causal relationships. The Filtering Feature may also use the output generated by the Query Engine to display filtering criteria based on paper-level metadata, such as publication year, journal rating, number of citations, etc. The Filtering Feature can be shown in one or more places in the Causal Mapping Interface (for example directly adjacent to a causal map). Some of its functionality can also be combined with that of the Search Interface.

Map Display Adjustment. Upon viewing a causal map result, particularly a result with many discrete constructs, the user can manage its size, location, or overall display in one or more ways. For example, the user can zoom in or out of viewing the map by clicking on icons to the side of it (e.g., magnifying glass icons). Alternatively, the user can drag the map, by clicking, holding, and moving any portion of it, to whatever position she may choose. By default, the Causal Mapping Engine could render all maps, however large and/or complex, to fit-centered-within its mapping pane, so that the user can immediately see the causal framework of interest. However, if the map rendered by the Causal Mapping Engine is too large and/or complex for the user to immediately understand (or too large for the user's comfort), the user can choose to adjust their viewing of the map via the Map Display Adjustment feature.

An alternative to the Causal Mapping Engine described so far is an Associative Mapping Engine, which visually represents constructs that co-occur across papers, or which are conceptually related, but which does not visually depict any types of relationships between these constructs. The Causal and Associative Mapping Engines can operate in parallel, or can be combined into one engine. The user can choose, for example via the Map Display Adjustment Feature, whether he wants to see a causal mapping or an associative mapping view of the results, and can potentially switch between the two types of views.

Construct/Relationship Subscription Management. By clicking on a specific relationship path or construct node (or on particular visual indicators associated with a path or node), users will be able to subscribe to receiving electronic notifications (e.g. email notifications) of any papers or studies that have been newly added to the system's Construct Database and that match the construct or relationship clicked on. The Construct/Relationship Subscription Management feature is also accessible from the Textual Listings Module.

Textual Listings Module

This module is invoked whenever a user chooses to see the output of a search query in a text-based format. It displays the results of the Query Engine as a list of constructs and/or relationships that are relevant to the user's query. The results can be ranked according to a variety of factors, such as the corresponding research volume per construct/relationship.

This module is also invoked when a user wants to see a list of papers that relate to a particular construct or relationship within a causal map. In that case, the module produces textual listing of only those papers that deal with the causal relationship of interest, whereby the papers can be grouped according to such constructs and relationships. For each paper, the module can show, for example, the name of the paper, the name of the papers' authors, the publication year, or any other information based on the metadata values available for that paper. The module can also show and/or embed links to one or more locations from which those papers can be retrieved. Such locations may include, but are not limited to, the paper's DOI location (i.e., the universal and permanent internet address of a published paper), an external database or digital library that contains the paper, a location on the internal server where the paper is stored, etc. The papers may be ordered according to a variety of criteria, such as publication year, number of citations, journal ranking, etc.

Error Reporting. Upon viewing the textual listings of papers on a particular construct and/or relationship, users can submit to the system a report about any errors they discern in the ways in which the system has apparently associated those papers to the construct(s) or relationship(s) of interest. They can also provide other error reports such as suggesting papers that are relevant to a particular construct or relationship and which do not appear in the Search Result Interface. Such error reports can then be transmitted to the Query Engine module, or to the Construct Database, either in their original form, or after being modified by a third party, and would serve for use in later improvements to the indexing/classification of papers, constructs, and/or relationships.

In more detail, the workflow for a user query comprises the following processes:

The user starts off by indicating via the Search Interface whether she is interested in retrieving information about a construct, a relationship between constructs, or specific papers of interest (the last of which is based on paper-level metadata values). This indication may be done explicitly (whereby the user selects a particular option) or implicitly (whereby the user fills in certain entry fields, but not others).

If the user is interested in a particular construct, she will be prompted to enter a name for that construct into the Search Interface. She can further specify whether she wants a particular causal role (i.e., independent variable, dependent variable, mediator etc.) assigned to that construct.

The Query Engine automatically compares the user-specified name against the construct names stored in the Construct Database, and determines whether a matching construct name can be found.

If no matching construct name can be found, a message is returned to the user. This message can, for example, indicate the absence of a matching construct name and recommend a list of alternative construct names for the user to choose from.

If a matching construct name can be found, then the system identifies in the Construct Database the construct name that is associated with that particular name.

If the user is interested in a particular relationship between constructs, she will be prompted to enter a name for each construct into the Search Interface. She can further specify whether she wants a particular causal role assigned to each construct.

The system will perform Steps i-iii until the construct name associated with each user-specified name has been identified.

If the user is interested in a particular paper, she will be prompted to enter identification information about that paper (such as authors, title, etc.) into the Search Interface. The Query Engine will attempt to identify that paper in the Construct Database.

If no matching paper can be found, a message is returned to the user. This message can, for example, indicate the absence of a matching paper and recommend a list of alternative paper for the user to choose from.

Once the relevant construct name(s) or the relevant paper have been successfully identified, the user will select whether she wants to see a text-based or a visual representation of the query results.

If the user selects a text-based representation of the results, the Textual Listings Module will generate a list of relationships (described in terms of the constructs included in each relationship and the corresponding causal role for each construct) and/or papers that are relevant to the user's query.

If the user selects a visual representation of the results, she will see a causal map generated by the Causal Mapping Engine as follows:

If the search query specified a construct of interest, the user will first see a construct map. She can then choose to click on any relationship of interest within the construct map to view a relationship map. She can alternatively choose to click on any research volume indicator (or another visual indicator) in the construct map to view a list of relevant papers, as generated by the Textual Listings Module. She can then choose to review the textual information available about any papers of interest (including following the links that direct her to each paper's location, which can be either inside or outside the present system), or click on any paper name (or some other visual indicator associated with that paper) to see a model map for that paper (or for a study in that paper).

If the search query specified a relationship of interest, the user will see a relationship map. She can additionally choose to click on any paper count indicator (or another visual indicator) in the relationship map to view a list of relevant papers, as generated by the Textual Listings Module. She can then choose to review the textual information available about any papers of interest (including following the links that direct her to each paper's location) or click on any paper name (or some other visual indicator associated with that paper) to see a model map for that paper (or for a study in that paper).

If the search query specified a paper of interest, the user will see a model map for that paper, along with any textual information available about the paper. She can then choose to click on any individual study to see a model map for that study.

Figure 11:
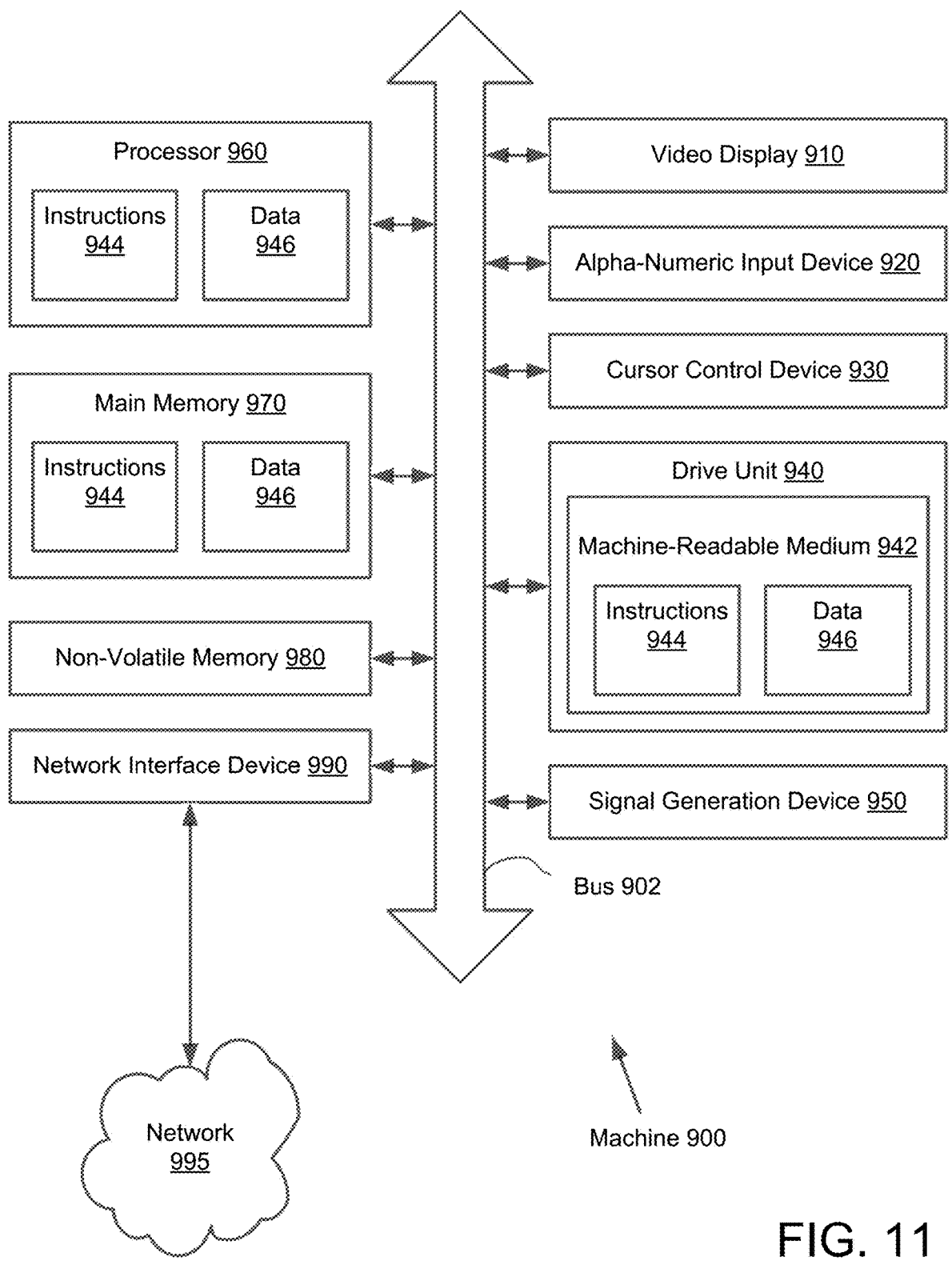
FIG. 11 illustrates one embodiment of a diagrammatic representation of an embodiment of a machine 900, within which a set of instructions for causing the machine to perform one or more of the methodologies discussed herein may be executed.

FIG. 11 is a diagrammatic representation of an embodiment of a machine 900, within which a set of instructions for causing the machine to perform one or more of the methodologies discussed herein may be executed. The machine may be connected (e.g., networked) to other machines. In a networked deployment, the machine may operate in the capacity of a server or a client machine in a client-server network environment, or as a peer machine in a peer-to-peer (or distributed) network environment. In one embodiment, the machine communicates with a server to facilitate operations of the server and/or to access the operation of the server. In some embodiments, the machine may act as a server for some functions and a client for other functions.

In some embodiments, the machine 900 runs the application 100 or application 200. In other embodiments, the machine 900 is the search, visualization and navigation operations according to an embodiment as described herein or a component of such systems, such as one or more modules or units described herein. In other embodiments, the machine 900 is the Construct Database according to an embodiment as described herein.

The machine 900 includes a processor 960 (e.g., a central processing unit (CPU), a graphics processing unit (GPU) or both), a main memory 970 and a nonvolatile memory 980, which communicate with each other via a bus 902. In some embodiments, the machine 900 may be a cluster of computers or comprise multiple processors or multiple processor cores. In one embodiment, the machine 900 also includes a video display 910, an alphanumeric input device 920 (e.g., a keyboard), a cursor control device 930 (e.g., a mouse), a drive unit 940 (e.g., solid state drive (SSD), hard disk drive, Digital Versatile Disk (DVD) drive, or flash drive), a signal generation device 950 (e.g., a speaker) and a network interface device 990.

In some embodiments, the video display 910 includes a touch-sensitive screen for user input. In some embodiments, the touch-sensitive screen is used instead of a keyboard and mouse. The drive unit 940 includes a machine readable medium 942 on which is stored one or more sets of instructions 944 (e.g. software) embodying any one or more of the methods or functions of the inventive subject matter.

The instructions 944 may also reside, completely or partially, on machine-readable media within the main memory 940 and within machine-readable media within the processor 960 during execution thereof by the machine 900. The instructions 944 may also be transmitted or received over a network 995 via the network interface device 990. In some embodiments, the machine-readable medium 942 also includes a database 944 including some of the received information.

While the machine-readable medium 942 is shown in an exemplary embodiment to be a single medium, the term "machine-readable medium" should be taken to include a single medium or multiple media (e.g., a centralized or distributed database, and/or associated caches and servers) that store the one or more sets of instructions and/or data. The term "machine readable medium" shall also be taken to include any non-transitory medium that is capable of storing, encoding or carrying a set of instructions for execution by the machine and that cause the machine to perform any one or more of the methods or functions of the inventive subject matter. The term "machine-readable medium" shall accordingly be taken to include, but not be limited to, solid-state memories, optical and magnetic media, and other non-transitory tangible media.

In general, the methods executed to implement the embodiments of the disclosure, may be implemented as part of an operating system or a specific application, component, program, object, module or sequence of instructions referred to as "programs." For example, one or more programs may be used to execute specific processes according to the inventive subject matter. The programs typically comprise one or more instructions set at various times in various memory and storage devices in the machine, and that, when read and executed by one or more processors, cause the machine to perform operations to execute methods, functions and other elements of the inventive subject matter.

Moreover, while embodiments have been described in the context of machines, those skilled in the art will appreciate that the various embodiments are capable of being distributed as a program product in a variety of forms, and that the disclosure applies equally regardless of the particular type of machine or computer-readable media used to actually effect the distribution. Examples of machine-readable media include, but are not limited to, recordable type media such as volatile and non-volatile memory devices, flash memory devices, floppy and other removable disks, hard disk drives, and optical disks such as Compact Disk Read-Only Memory (CD-ROMS) and Digital Versatile Disks (DVDs), among others.

What is claimed is:

1. A computer-implemented method for identifying construct relationships examined in a document, comprising:
    parsing text or other features in a first document to identify one or more studies;
    for each study identified in the first document:
    identifying two or more constructs that were manipulated or measured in the study, different mentions of a construct being treated as belonging to the same construct, with each construct being unique in the context of the study and determining a causal role for each of the two or more constructs identified in the study, the causal role of each construct comprising at least one of an independent variable, a dependent variable, a mediator variable or a covariate;
    storing in a database the identified two or more constructs and the determined causal role for each of the identified two or more constructs, as well as a first identifier for the associated study and a second identifier for the first document; and
    using the two or more identified constructs and the determined causal role for each construct to infer the presence of examined causal relationships and their direction, by leveraging an assumption that all independent variables and covariates have been examined for potentially affecting at least one dependent variable in the same study, and all mediator variables have been examined for potentially mediating at least one relationship between one independent variable and one dependent variable in the same study.

2. The computer-implemented method of claim 1 further comprising applying at least one of natural language processing and machine learning to at least one study within a document.

3. The computer-implemented method of claim 1 further comprising associating at least one of the identified two or more constructs, or any semantic or synonymic variation of a construct, with an ontological category.

4. The computer-implemented method of claim 1 wherein the construct relationship comprises at least one of causation or some other relationship that includes at least one independent and one dependent variable.

5. The method of claim 2 whereby identifying two or more constructs that were manipulated or measured in the study and determining a causal role for each of the two or more constructs identified in the study can be executed as part of one or more Machine Learning tasks.

6. The method of claim 1 wherein the step of identifying one or more studies in a document comprises identifying sections within each study.

7. A computer program product for identifying construct relationships examined in a document, comprising at least one machine-readable medium, the at least one machine-readable medium storing instructions, the instructions comprising:
    instructions which when executed by at least one processor cause parsing of text or other features in a first document to identify one or more studies;
    for each study identified in the first document:
    instructions which when executed by at least one processor cause identifying two or more constructs that were manipulated or measured in the study and determining a causal role for each of the two or more constructs in the study;
    instructions which when executed by at least one processor cause storing in a database the identified two or more constructs, the identified causal roles for each of the identified two or more constructs, a first identifier for the associated study and a second identifier for the first document; and
    instructions using the two or more identified constructs and the determined causal role for each of the two or more identified constructs to infer the causal relationships examined between the two or more identified constructs and the direction of each causal relationship, by leveraging an assumption that all independent variables and covariates have been examined for potentially affecting at least one dependent variable within the same study, and all mediator variables have been examined for potentially mediating a relationship between at least one independent variable and one dependent variable within the same study.

8. The computer program product of claim 7 further comprising instructions which when executed by at least one processor cause applying at least one of natural language processing and machine learning to at least one study.

9. The computer program product of claim 7 further comprising instructions which when executed by at least one processor cause associating at least one of the at least two of constructs with an ontological category.

10. A computer implemented system for construct and study-based document indexing comprising:
    a study identification unit configured to identify one or more studies in documents;
    a construct and causal role identification unit configured to identify two or more constructs that were manipulated or measured in each study
    and to determine a causal role for each identified construct within each study, the causal role comprising at least one of an independent variable, a dependent variable, a mediator variable or a covariate;
    a causal relationship inference unit for inferring the presence of examined causal relationships and their direction, by leveraging an assumption that all independent variables and covariates have been examined for potentially affecting at least one dependent variable in the same study, and all mediator variables have been examined for potentially mediating a relationship between at least one independent variable and one dependent variable in the same study; and
    a database configured to store in a computer-readable medium the identified two or more constructs with the determined causal role for each of the identified two or more constructs within each study, a first identifier for each study associated with a construct and a second identifier for the document associated with each study.

11. A computer-implemented method for generating an aggregated, visual causal framework for a specified construct, comprising:

receiving a query specifying at least one construct, the query being responsive to at least one of text, speech, and graphical user-input from a human or machine;

searching a database to find at least one construct exactly or closely matching the specified construct;

identifying at least one document associated with at least one first study in which the matching at least one construct has a causal role comprising at least one of an independent variable, a dependent variable, a mediator variable, or a covariate;

displaying a causal framework for the matching at least one construct, in which the position of the matching at least one construct relative to the position of a second construct is indicative of the causal role played by each construct in at least one study that examined both constructs, the causal framework comprising:

a first visual representation for the at least one matching construct;

a second visual representation for a construct stored in the database as having the causal role of independent variable or mediator variable in at least one second study in which the matching at least one construct has the causal role of dependent variable, such second visual representation positioned to the left of the first visual representation for the specified construct; and a third visual representation for a construct stored in the database as having the causal role of dependent variable in at least one third study in which the matching at least one construct has the causal role of independent variable or mediator variable, such third visual representation positioned to the right of the first visual representation for the matching at least one construct;

one or more fourth visual representations connecting the visually represented construct to the left of the matching at least one construct with the matching at least one construct, thereby signifying an examined causal relationship between the connected constructs; and one or more fifth visual representations connecting the matching at least one construct with the visually represented construct to the right of the matching at least one construct, thereby signifying an examined causal relationship between the connected constructs.

12. The method of claim 11, wherein a construct visually represented in an aggregated causal framework for a specified construct is equated with an ontological category that the construct may have been previously assigned to.

13. The method of claim 11, wherein in an aggregated causal framework for a specified construct each fourth visual representation connecting the first visual representation for the matching at least one construct to a second representation for the second construct is accompanied by a sixth visual representation showing the number of unique documents associated with at least one study in which the matching at least one construct and the second construct each have the causal role that corresponds to their respective position relative to each other in the aggregate causal framework.

14. The method of claim 13, wherein the sixth visual representation, when interacted with, generates a list of the unique documents containing at least one study in which the matching at least one construct and the second construct each have the causal role that corresponds to their respective position relative to each other in the aggregate causal framework.

15. A computer-implemented method for generating an aggregated, visual causal framework for a specified causal relationship, comprising:

receiving a query specifying a causal relationship from at least one predictor construct or independent variable to at least one outcome construct or dependent variable, the query being responsive to at least one of text, speech and graphical user-input from a human or machine;

searching a database to match the specified causal relationship;

identifying at least one document associated with at least one first study in which the predictor construct has a causal role of independent variable and the outcome construct has a causal role of dependent variable;

displaying a causal framework for the specified causal relationship, in which the position of the specified predictor construct and the position of the specified outcome construct relative to each other and relative to the position of a third construct is indicative of the causal role played by each of the three constructs in at least one first study that examined all three constructs, the causal framework comprising:

a first visual representation for the predictor construct;

a second visual representation for the outcome construct, positioned to the right of the predictor construct;

a third visual representation for a third construct, other than the predictor construct, stored in the database as having the causal role of independent variable or moderator variable in at least one second study in which the predictor construct has the causal role of independent variable and the outcome construct has the causal role of dependent variable, each such third visual representation positioned between the predictor construct and the outcome construct;

a fourth visual representation for a fourth construct, other than the predictor construct or the outcome construct, stored in the database as having the causal role of mediator variable in at least one third study in which the predictor construct has the causal role of independent variable and the outcome construct has the causal role of dependent variable, each such fifth visual representation positioned between the predictor construct and the outcome construct; and a sixth visual representation connecting the first visual representation for the predictor construct to the second visual representation for the outcome construct.

16. The method of claim 15, wherein a construct visually represented in an aggregated causal framework for a specified causal relationship is equated with an ontological category that the construct may have been previously assigned to.

17. The method of claim 15, wherein in an aggregated causal framework for a specified causal relationship, each third visual representation for the third construct is accompanied by a seventh visual representation showing the number of unique documents associated with at least one study in which the specified predictor construct, the specified outcome construct, and the third construct each have the causal role that corresponds to their respective position relative to one other in the aggregate causal framework.

18. The method of claim 17, wherein the seventh visual representation, when interacted with, generates a list of the unique documents containing at least one study in which the specified predictor construct, the specified outcome construct, and the third construct each have the causal role that corresponds to their respective position relative to one other in the aggregate causal framework.

19. The method of claim 15, wherein the sixth visual representation connecting the first visual representation for the predictor construct to the second visual representation for the outcome construct is a line.

20. The method of claim 15, wherein the visual representation for any third construct is positioned above or below the line connecting the visual representation for the predictor construct to the visual representation for the outcome construct.

21. The method of claim 15, wherein the visual representation for any fourth construct is positioned on the line connecting the visual representation for the predictor construct to the visual representation for the outcome construct.

22. A computer-implemented method for identifying and visually representing construct relationships examined in a document, comprising:
    parsing text or other features in a first document to identify one or more studies;
    for each study:
    identifying two or more constructs that were manipulated or measured in the study, different mentions of a construct being treated as belonging to the same construct, with each construct being unique in the context of the study, and determining a causal role for each of the two or more constructs identified in the study, the causal role comprising at least one of an independent variable, a dependent variable, a mediator variable or a covariate;
    storing in a database the identified two or more constructs with the determined causal role for each of the identified two or more constructs, as well as a first identifier for the associated study and a second identifier for the first document; and
    receiving a query specifying at least one construct, the query being responsive to at least one of text, speech, or graphical user-input from a human or machine;
    searching the database to find at least one construct exactly or closely matching the specified construct;
    identifying at least one document associated with at least one study in which the matching at least one construct has a causal role comprising at least one of an independent variable, a dependent variable, a mediator variable, or a covariate;
    displaying a causal framework for the matching at least one construct, in which the position of the matching at least one construct relative to the position of a second construct is indicative of the causal role played by each construct in at least one study that examined both constructs, the causal framework comprising:
    a first visual representation for the matching at least one construct;
    a second visual representation for a construct stored in the database as having a causal role of independent variable or mediator variable in at least one study in which the matching at least one construct has a causal role of dependent variable, such second visual representation positioned to the left of the first visual representation for the matching at least one construct;
    a third visual representation for a construct stored in the database as having a causal role of dependent variable in at least one study in which the matching at least one construct has a causal role of independent variable or mediator variable, such third visual representation positioned to the right of the first visual representation for the matching at least one construct; and
    a fourth visual representation connecting the second visual representation positioned to the left of the matching at least one construct to the first visual representation for the matching at least one construct, and a fifth visual representation connecting the first visual representation for the matching at least one construct with the third visual representation positioned to the right of the matching at least one construct.

23. The method of claim 22, wherein a construct visually represented in an aggregated causal framework for a specified causal relationship is equated to an ontological category that the construct may have been were previously assigned to.

* * * * *